(12) United States Patent
Turner et al.

(10) Patent No.: US 11,153,023 B2
(45) Date of Patent: Oct. 19, 2021

(54) REDUCING INTERFERENCE BY COMBINING SIGNALS AT DIFFERENT STRENGTHS AND TRANSMITTING THE COMBINED SIGNAL FROM AN ANTENNA

(71) Applicants: AT&T Intellectual Property I, L.P., Atlanta, GA (US); AT&T Mobility II LLC, Atlanta, GA (US)

(72) Inventors: Paul Turner, Greenbrier, AR (US); Kurt Huber, Atlanta, GA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days.

(21) Appl. No.: 16/376,098

(22) Filed: Apr. 5, 2019

(65) Prior Publication Data
US 2020/0322074 A1    Oct. 8, 2020

(51) Int. Cl.
*H04J 1/12* (2006.01)
*H04J 1/08* (2006.01)
*H04B 7/185* (2006.01)

(52) U.S. Cl.
CPC ............ *H04J 1/12* (2013.01); *H04B 7/18513* (2013.01); *H04J 1/08* (2013.01)

(58) Field of Classification Search
CPC ....................................................... H04J 1/12
See application file for complete search history.

(56) References Cited

U.S. PATENT DOCUMENTS

| 6,104,908 | A | * | 8/2000 | Schaffner | H04H 20/63 348/E7.05 |
|---|---|---|---|---|---|
| 9,585,193 | B2 | | 2/2017 | Wala et al. | |
| 9,755,775 | B2 | | 9/2017 | Wang | |
| 9,819,769 | B2 | | 11/2017 | Chakrabarti et al. | |
| 2002/0089995 | A1 | * | 7/2002 | Shalvi | H04N 7/102 370/431 |
| 2003/0022636 | A1 | * | 1/2003 | Ylitalo | H04L 1/0048 455/101 |

(Continued)

FOREIGN PATENT DOCUMENTS

| WO | 2015125076 A1 | 8/2015 |
|---|---|---|
| WO | 2018017468 A1 | 1/2018 |
| WO | 2018176424 A1 | 10/2018 |

*Primary Examiner* — Sulaiman Nooristany
(74) *Attorney, Agent, or Firm* — Amin, Turocy & Watson, LLP

(57) ABSTRACT

The technologies described herein are generally directed toward facilitating indicating frequency and time domain resources in communication systems with multiple transmission points. According to an embodiment, a system can comprise a processor, a base transceiver station, and a memory that can store executable instructions that, when executed by the processor, can facilitate performance of operations. The operations can include receiving a first signal. The operations can further include combining the first signal with a second signal resulting in a combined signal, wherein the first signal can be combined using a different weight than is applied to the second signal. The operations can further include broadcasting by an antenna of the base transceiver station, the combined signal.

20 Claims, 9 Drawing Sheets

(56) References Cited

U.S. PATENT DOCUMENTS

| | | | |
|---|---|---|---|
| 2012/0042345 A1* | 2/2012 | Tjio | H04L 12/2834 |
| | | | 725/63 |
| 2015/0078258 A1 | 3/2015 | Stewart et al. | |
| 2015/0244618 A1 | 8/2015 | Chakrabarti et al. | |
| 2015/0245245 A1 | 8/2015 | Chakrabarti et al. | |
| 2015/0249549 A1 | 9/2015 | Martinotti et al. | |
| 2016/0056865 A1 | 2/2016 | Uyehara et al. | |
| 2016/0057121 A1 | 2/2016 | Metsala et al. | |
| 2018/0041999 A1* | 2/2018 | Jackson | H04B 7/15528 |
| 2018/0191873 A1 | 7/2018 | Bao et al. | |

\* cited by examiner

REDUCING INTERFERENCE BY COMBINING SIGNALS AT DIFFERENT STRENGTHS AND TRANSMITTING THE COMBINED SIGNAL FROM AN ANTENNA

TECHNICAL FIELD

The subject application is related to wireless communication systems, and, for example, reducing interference between signals.

BACKGROUND

Limited available bandwidth has led to different wireless uses sharing adjacent parts of the available spectrum. Different wireless uses can have a variety of different characteristics, including using receivers with different tolerances for interference from adjacent signals, requiring both uplink and downlink signals, having transmission powers greater than adjacent signals, and other like differences. Examples of different uses that can share adjacent bandwidth included cellular communications and broadcast radio.

When signals with adjacent or overlapping bandwidth are transmitted from proximate locations, to address differences in the signals (e.g., the differences noted above) adjustments to the transmission of one or both of signals may have to be made in order to facilitate both signals being received and decoded by their respective receivers. In some circumstances however, adjustments to mitigate interference can render one or both signals unusable by respective receivers.

BRIEF DESCRIPTION OF THE DRAWINGS

The technology described herein is illustrated by way of example and not limited in the accompanying figures in which like reference numerals indicate similar elements and in which.

DETAILED DESCRIPTION

Generally speaking, one or more embodiments described herein provide mechanisms to facilitate reducing interference by combining signals at different strengths and transmitting the combined signal from an antenna. The computer processing systems, computer-implemented methods, apparatus and/or computer program products described herein employ hardware and/or software to solve problems that are highly technical in nature (e.g., reducing interference by combining signals at selected, different signal strengths), that are not abstract and cannot be performed as a set of mental acts by a human. For example, a human, or even a plurality of humans, cannot efficiently, accurately and effectively select a ratio for combining signals and combine the signals with the same level of accuracy and/or efficiency as the various embodiments described herein.

Further, some of the processes performed can be performed by specialized computers for carrying out defined tasks related to facilitate reducing interference by combining signals at different strengths and transmitting the combined signal from an antenna. One or more embodiments described herein can be employed to solve new problems that arise through advancements in technology, computer networks, the Internet, and the like. System 300 or other systems detailed herein can provide technical improvements to facilitate reducing interference by combining signals at different strengths and transmitting the combined signal from an antenna, but are not limited to, improving the reduction of interference between signals, e.g., signals having adjacent frequencies and receivers with different filtering characteristics.

Figure 1:
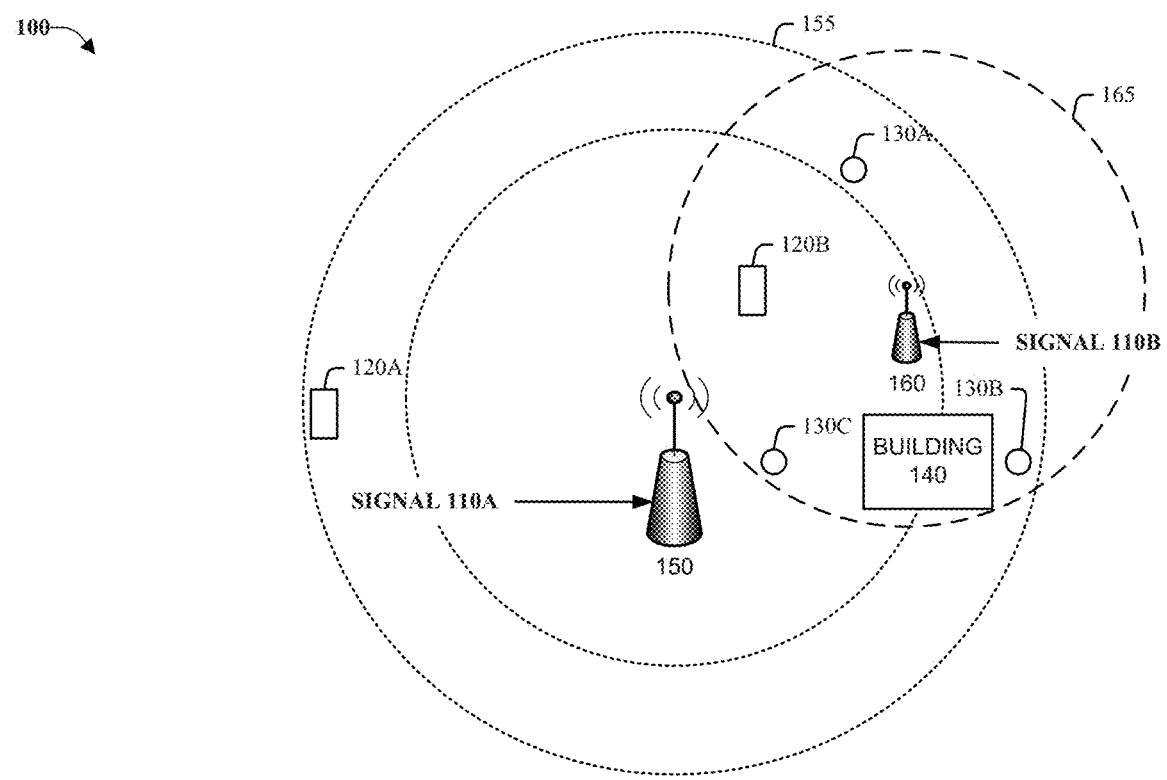
FIG. 1 illustrates an example diagram of two signals transmitted from two sites using two different antennas in accordance with one or more embodiments described herein.

FIG. 1 illustrates an example diagram of two signals transmitted from first site 150 and second site 160 using two different antennas in accordance with one or more embodiments described herein, e.g., the signals being transmitted from an antenna at each site. It should be noted, that when an antenna is discussed herein, an antenna array of multiple radiating elements can also be used, without departing from the spirit of one or more embodiments described herein. It should also be noted that, notwithstanding the examples where first site 150 and second site 160 are geographically separated, the examples below still apply, even when signals 110A-B are transmitted from different antennas on the same tower.

Using an antenna, first site 150 can broadcast signal 110A to an example range 155, within which, the signal may be able to be received by signal receivers 120A-B. Using another antenna, second site 160 broadcasts signal 110B to an example range 165, within which, it may be able to be received by signal receivers 130A-C. Building 140 is shown, and provides an example of a potential weakening of first and second signals 110A-B due to different factors, e.g., path-loss from building 140.

In one or more embodiments, signals 110A and 110B are different types of signals that are to be received by different types of receivers, e.g., signal receivers 120A-B and 130A-C. In this non-limiting example, signal 110A is bidirectional cellular data network signal and signal receivers 120A-B are user equipments, second site 160 is a Satellite Digital Audio Radio Service (SDARS) terrestrial repeater broadcast station, signal 110B is a terrestrial broadcast of satellite radio content, and signal receivers 130A-B are portable satellite radio receivers. Continuing this example, signals 110A and 110B, in FIG. 1, are broadcasting portions of signals using frequencies in an adjacent area of the radio spectrum. For example, signal 110A can be broadcast within 2315-2320 Mhz (e.g., Wireless Communication Service (WCS) C-Block frequencies), and signal 110B can be broadcast within 2320-2324.54 Mhz (e.g., SDARS terrestrial repeater block). In this example, because user equipments (e.g., signal receivers 120A-B) and satellite radio receivers (e.g., signal receivers 130A-C), have different signal receiving capabilities and the frequency blocks are adjacent, in some circumstances, measures are taken to avoid interference between the signals.

One type of interference that can occur in this example is related to the capacity of signal receivers 130A-C (e.g., satellite radio receivers) to filter out signal 110A while receiving and decoding signal 110B, e.g., signal 110A can be noise to receivers of signal 110B, capable of muting and/or impairing the receiving of signal 110B by receivers 130A-C. When overlap of signals is detected (e.g., as shown in FIG. 1), ways to address this type of interference include, but are not limited to, reducing the transmission power of signal 110A, increasing the transmission power of signal 110B, or both. In some circumstances, a range of ratios of transmission strengths of signals 110A-B can reduce the amount of noise received by signal receivers 130A-C and enable signal 110B to be successfully received and decoded. One way to select an amount of power to reduce signal 110A by, is to measure the strength of both signals at different geographic points, and select a power level that allows signal receivers 130A-C to receive and decode signal 110B.

In one or more embodiments, the ratio of signal strengths of signals 110A-B can be expressed in decibels (dB). For example, one non-limiting example, when received by signal receivers 130A-C (e.g., satellite radio receivers), signal 110B can be at a level 6 dB (four times) below the level of signal 110A (e.g., a cellular data signal). In some circumstances where this ratio is maintained (e.g., by raising or lowering the strength of signals 110A-B), signal 110B will be able to be received and decoded, e.g., by signal receiver 130A.

In other circumstances however, because of different antenna profiles between the antenna of first site 150 and the antenna of second site 160, the signal ratio of signals 110A-B at the receiver can be substantially different than the selected ratio. For example, the proximity of 130C to first site 150 can cause the strength of signal 110A in the ratio to be higher than the selected value, and signal receiver 130B being blocked by building 140, can affect the ratio in unpredictable ways, e.g., the extent to which building 140 blocks both signals. Based on these different actual ratios at the receivers, while receiver 130A can receive and decode signal 110B, signal receivers 130A and 130C can have signal 110B muted and/or impaired by signal 110A. The example positioning of building 140 illustrates how first site 150 and second site 160 can have different antenna profiles with respect to signal receiver 130B, e.g., in this example, building 140 can cause different signal path-losses for signals from each source.

It is also important to note that, adjusting the ratio between signals 110A-B to attempt to correct a deficiency in a ratio of the strength of these signals (e.g., to correct one or more of too high a signal strength for signal 110A, or too low as strength for signal 110B), may not correct the problem. For example, as would be appreciated by one having skill in the relevant arts, given the description herein, when the aggregate strength of signals 110A-B exceeds an overload value (e.g., one or more of signal receivers 130A-C), the operation of signal receivers 130A-C can become non-linear, e.g., even if the 110B signal is increased in strength, signal receivers 130A-C cannot process the aggregated signal load at the range of frequencies used by signals 110A-B.

In some circumstances, an optimizing approach can be taken that selects a signal strength for one or both signals that can yield the best results, e.g., achieving a minimum threshold of muted or impaired receivers 130A-V, while maintaining adequate performance for first site 150 serving signal receivers 120A-B. One having skill in the relevant arts, given the description herein, will appreciate that, depending on the optimizing criteria used, there is a potential for many signal receivers 130A-C to be unable to demodulate signal 110B due too low or too high a signal strength. Additionally, in some circumstances the optimizing function may indicate a signal strength needed for signal 110A that impairs the performance of first site 150 so significantly, that first site 150 is essentially not usable.

Figure 2:
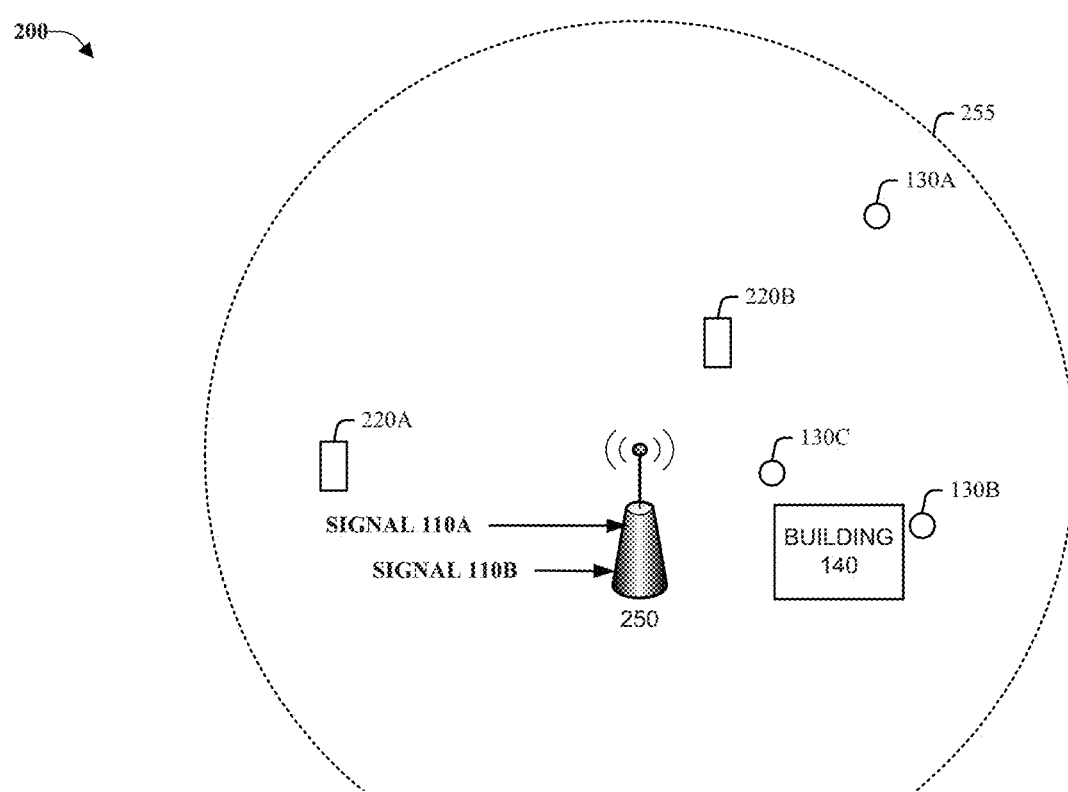
FIG. 2 illustrates an example diagram of two signals combined and transmitted from one site using an antenna, in accordance with one or more embodiments described herein.

FIG. 2 illustrates an example diagram of two signals combined and transmitted from one site 250 using an antenna, in accordance with one or more embodiments described herein. Repetitive description of like elements employed in other embodiments described herein is omitted for sake of brevity.

Like first site 150 and second site 160, site 250 can communicate signals 110A-B, but in contrast to the example approach of FIG. 1, in one or more embodiments, signals 110A-B can be combined for transmission into signal 210. One approach to combining signals 110A-B the can be used by one or more embodiments modulates signals 110A-B on carriers of different frequencies, e.g., the frequencies used to broadcast them separately in FIG. 1. In one or more embodiments, this can be an implementation of frequency-domain multiplexing of the two signals.

Thus, in a variation of the example above, signal 110A can be modulated on a carrier of a frequency within 2315-2320 Mhz, and signal 110B can be modulated on a carrier of a frequency within 2320-2324.54 Mhz. In this example, signal receivers 120A-B and 130A-C and the devices receive the carriers corresponding to their allocated bandwidth. In one or more embodiments, this combination and transmission of signals 110A-B from a single antenna can improve the adjustment of signal strengths for receiving by signal receivers 120A-B and 130A-C because, when measurements are taken to select signal strength, instead of measurements of two signals being from two different antennas (e.g., first site 150 and second site 160 of FIG. 1), one signal can be measured from an antenna with one antenna profile, e.g., have the same fade profiles, as well as the same impairments (e.g., building 140) in roughly the same magnitude. Additional benefits and processes are described with FIG. 3 below.

Figure 3:
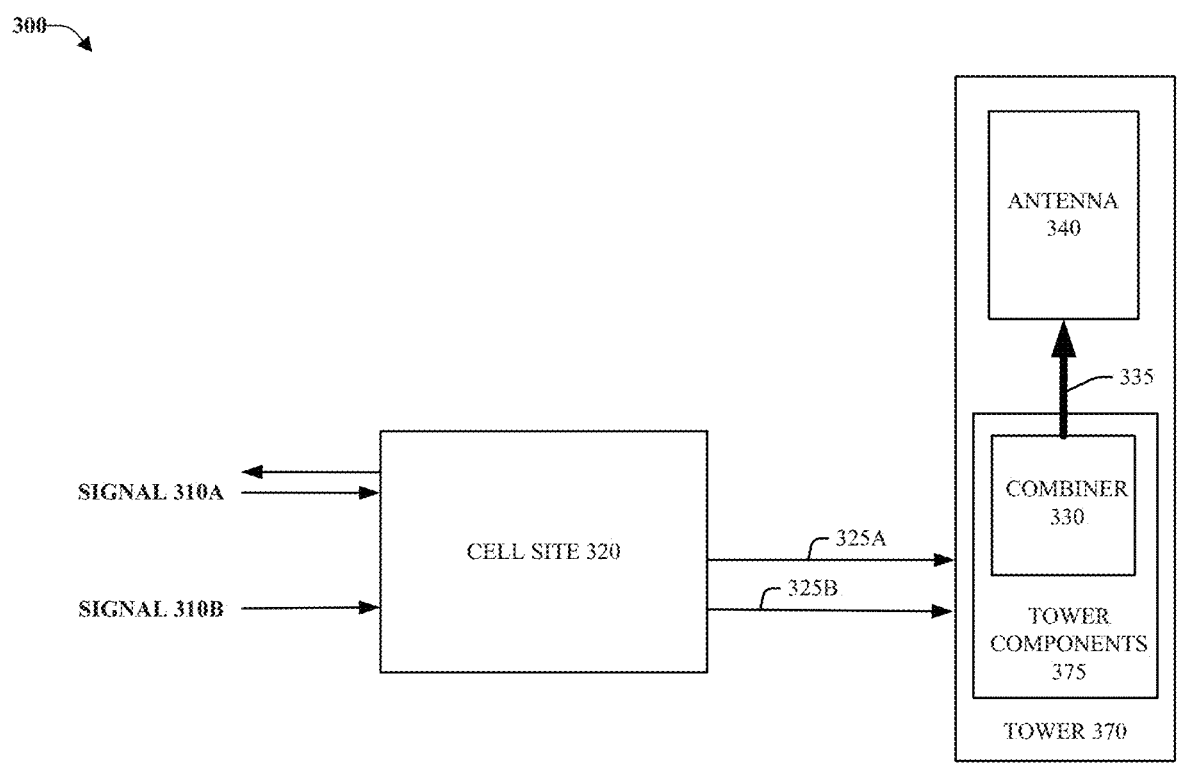
FIG. 3 illustrates a block diagram of a system for reducing interference between signals in accordance with one or more embodiments.

FIG. 3 illustrates a block diagram of a system 300 for reducing interference between signals in accordance with one or more embodiments. Repetitive description of like elements employed in other embodiments described herein is omitted for sake of brevity.

In one or more embodiments, system 300 is a more detailed view of site 250 of FIG. 2 discussed above. In a non-limiting example, cell site 320 can be communicatively coupled to tower components 375 of tower 370. Tower components can include combiner 330, which can be communicatively coupled to antenna 340. One or more of the functions performed by embodiments described herein can be facilitated by the operating environment described with FIG. 9 below, e.g., by employing computer 912, as a part of the hardware of a system that includes a processing unit 914, a system memory 916, and a system bus 918. Additionally, one or more embodiments of signal receivers (e.g., signal receivers 120A-B and 130A-C) can be facilitated by, as described with FIG. 8 below, a mobile handset that can facilitate one-way or two-way wireless communications according to one or more embodiments described herein.

In one or more embodiments, the functions of combiner 330 and other tower components 375 can be located in or divided between, one or more of cell site 320, tower 370, and other locations. One having skill in the relevant arts, given the description herein, would appreciate that, because of the characteristics of tower 370 (e.g., being exposed to elements, and subject to restrictions in power and space) one or more combinations of functions described herein can require significant design and implementation efforts to be successfully located or not located in tower 370.

Cell site 320 can receive signals 310A-B, the signals respectively being in this example, a bidirectional cellular data network signal, and a SDARS terrestrial repeater signal. It is important to note that other types of signals can also be handled by one or more embodiments. As discussed further with FIGS. 4-7 below, after receiving signals 310A-B, cell site 320 can perform different operations on signals 310A-B, e.g., conversion from one format to another for different purposes. Signals 325A-B, corresponding to signals 310A-B before passing through cell site 320, can be in a variety of different formats, as discussed with FIG. 4 below, including but not limited to, the Common Public Radio Interface (CPRI), Radio Frequency over Fiber (RFoF), and other available formats.

As discussed with FIG. 2 above, combiner 330 can combine signals 325A-B, e.g., using frequency-domain multiplexing. When two signals are combined as shown, combiner 330 can be termed a diplexer. It is important to note that, although many of the examples herein reference the reduction in interference in, and the combination of, two signals, in alternative embodiments, more than two signals can be combined with a reduction in interference, by the approaches described by embodiments herein.

Returning to the discussion of the combination process discussed with FIG. 2, signals 310A-B can be combined into a single multiplexed signal 335, antenna 340 can transmit signal 335 to signal receivers 120A-B (e.g., user equipments) and 130A-C (e.g., satellite radio receivers). In some circumstances, because measuring the strength of a single signal 335 is more accurate than measuring the strengths of two signals 110A-B transmitted in FIG. 1, the combining of the two signals at equal strengths can facilitate the reduction of interference between the signals 325A-B shown in FIG. 3.

In other circumstances, because the combining described above is done with equal strengths, because of differences in receiver capabilities (e.g., receivers of signal 325B may not have the ability to filter signals received as well as receivers of signal 325A) an equal strength in the multiplexed components of signal 335 can result in signal 325A interfering with signal 325B. As described with FIG. 4 below, one or more embodiments can further reduce the interference between signals 325A-B (e.g., reducing the swamping of signal 325B by signal 325A) by adjusting the strength of the multiplexed components in signal 335.

Figure 4:
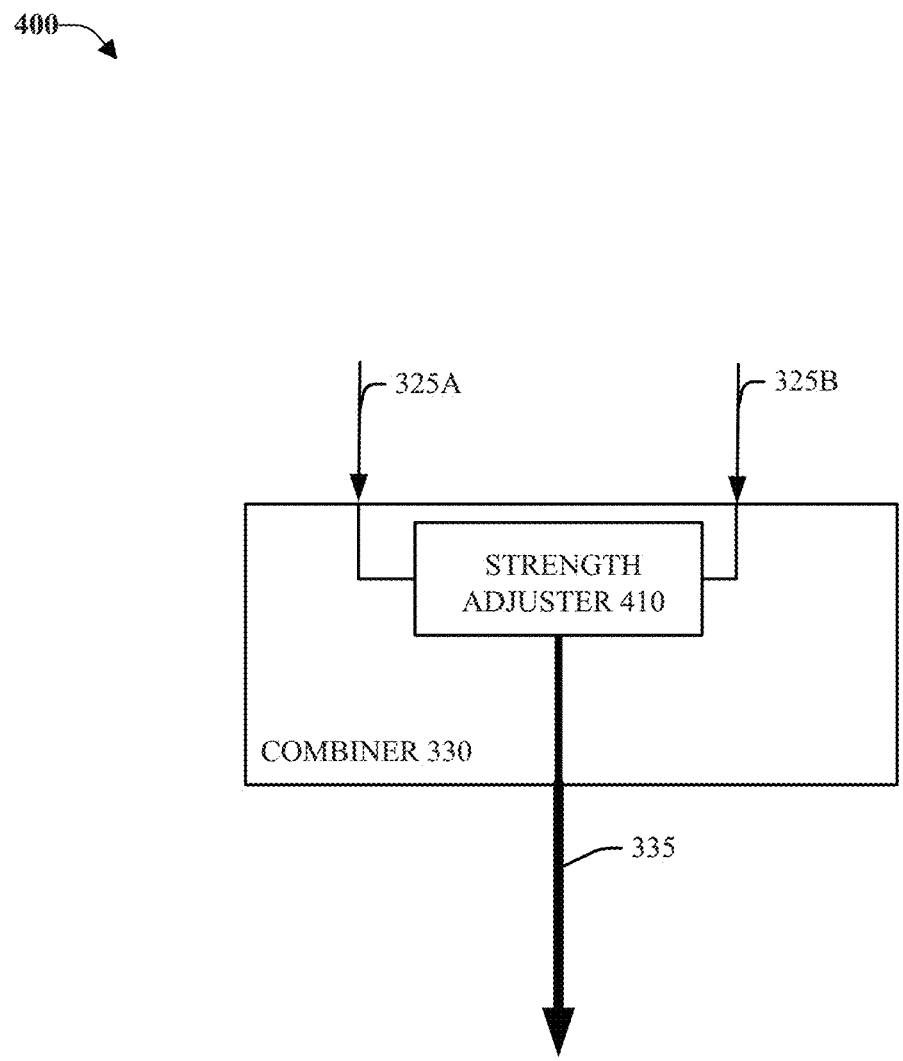
FIG. 4 depicts a more detailed view of a combiner in accordance with one or more embodiments.

FIG. 4 depicts a more detailed view 400 of combiner 330 in accordance with one or more embodiments. Repetitive description of like elements employed in other embodiments described herein is omitted for sake of brevity. FIG. 4 depicts signals 325A-B as inputs into strength adjuster 410 and multiplexed signal 335 as the output of this component.

During the combination of signals 325A-B into signal 335, one or more embodiments can employ strength adjuster 410 to adjust the ratio of two independently transmitted signals (e.g., signals 110A-B of FIG. 1), such that when received by a receiver (e.g., signal receivers 130A-C), one signal does not interfere with the other signal, e.g., signal 325A does not prevent the receiving and decoding of signals 325B. In one or more embodiments, this approach can be applied to one or more embodiments described with FIGS. 2-6, with additional benefits over the approach of FIG. 1.

In a non-limiting example, in one or more embodiments, during combination by combiner 330, strength adjuster 410 can combine signals 325A-B such that signal 325A is 6 dB (4 times) stronger than signal 325B (e.g., the cellular network signal 325A is 6 dB stronger than terrestrial satellite radio signal 325B). As noted above, 6 dB ratio can be selected based on measurements of signal strengths for both signals. In addition, based on a variety of factors discussed and implied above, different ratios can be selected for signal 355.

Upon implementation of signals with this ratio, in contrast to the example of FIG. 1, where the selected ratio was subject to change based, for example, on path loss of the two signals before measurement, in this approach, while the strength of multiplexed signal 335 can change, the ratio of the multiplexed components of signal 335 generally does not change, with beneficial effect. For example, as described above, in FIG. 1, the proximity of signal receiver 130C to first site 150 can cause the strength of signal 110A in the ratio to be higher than the selected value, and signal receiver 130B being blocked by building 140, can affect the ratio in unpredictable ways, e.g., the extent to which building 140 blocks both signals. In contrast, because in the presently described example, signal receivers 130B-C can receive the same multiplexed signal (e.g., with the same antenna profile), the ratio of the 325A-B components should be the same for each signal receiver, and even if the signal strength of signal 335 is stronger (e.g., for signal receiver 130C as compared to signal receiver 130B), the ratio of the components of signal 335 can remain constant.

In another contrasting result of the multiplexed approach, the potential for swamping signal receiver 130C by a high aggregate strength of the combination of signals 325A-B can be reduced. For example, because the ratio of the components and the transmitting strength of site 250 can be adjusted consistently across both types of receivers, the selection of signal strengths for the ratio of signals 325A-B can be more easily performed.

Although the examples above suggest a persistent selection of a transmission strength ratio, in additional embodiments, strength adjuster 410 can automatically receive periodic signal strength measurements from different locations within signal range 255. In an implementation, the periodic signal strength measurements can be similar to the setup measurements described above (e.g., which facilitated the selection of the ratio between signals 110A-B), but can additionally be performed automatically and from one or more selected locations. With periodic measurements, one or more embodiments of strength adjuster 410 can dynamically update the component ratio in signal 335 to match current conditions, e.g., signal strengths of the components of signal 335. In alternative or additional embodiments, strength adjuster can also adjust the component ratio based on a number of receiver devices present in signal range 255, e.g., when number of devices for which the ratio is used to reduce interference falls below a threshold (or is zero), strength determiner 410 can change or suspend the use of the ratio and, in some circumstances, boost the strength of the non-protected component. For example, based on information corresponding to a number of terrestrial radio receivers in signal range 255, strength adjuster 410 can adjust the relative strength of signal 325A upwards.

Figure 5:
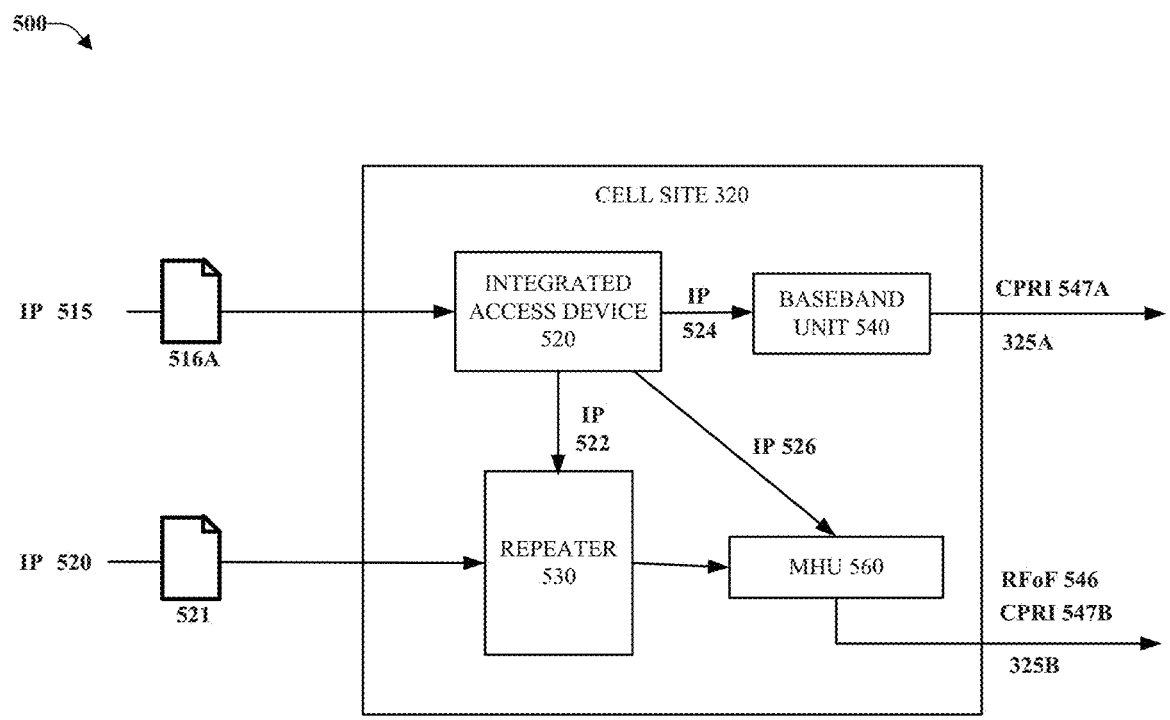
FIG. 5 illustrates an example block diagram of a more detailed view of the cell site of FIG. 3, in accordance with one or more embodiments.

FIG. 5 illustrates an example block diagram 500 of a more detailed view of cell site 320 of FIG. 3, in accordance with one or more embodiments. Repetitive description of like elements employed in other embodiments described herein is omitted for sake of brevity. To illustrate different embodiments, different configurations of components in cell site 320 are discussed below, e.g., combinations of one or more of integrated access device 520, repeater 530, and master host unit (MHU) 560. It should be noted that embodiments discussed with the description of FIG. 5 below, do not have to contain all of the elements depicted in FIG. 5, and, some elements may be combined into a single piece of equipment. For example, MHU 560 can be combined with repeater 530, in one or more embodiments.

In one or more embodiments, cell site 320 can receive signal 310A using an IP 515 connection, with packets 516 being a packetized signal 310A, e.g., backhaul content on a cellular network from the core. Further, IP 515 connection can employ an ETHERNET TO THE CELL SITE (ETTCS) protocol and, in other embodiments, different transmission protocols can be used, including legacy backhaul protocols such as time-division multiplexing (TDM). In one or more embodiments, signal 310B can also be received in IP form, e.g., packetized in packets 521. Further, signal 310B encoded in packets 521 can be received directly from a content source, e.g., signal 310B can be a SDARS terrestrial signal received from a satellite radio provider. In some embodiments, one or more of IP 515 and IP 520 connections can be delivered in a virtual private network (VPN).

In one or more embodiments, signal 310A can be received by integrated access device 520, and this component can allocate signal 310A via IP 524 to baseband unit (BBU) 540 or similar component. In one or more embodiments BBU 540 can convert IP 524 content into a CPRI signal 547A that can be communicated (e.g., by fiber-optic connection) by signal 325A to tower components 375 of tower 370, discussed in FIG. 7 below, e.g., to a radio resource unit (RRU) or similar component.

Continuing this discussion of embodiments, signal 310B signal can be received by repeater 530 and processed by MHU 560. Once received, signal 310B can be communicated via signal 325B to tower components 375 for amplification and combination with signal 325A and transmission of the combined signal, as discussed below. One way to communicate signal 325B to the cell tower is by conversion by components of cell site 320 to a Radio Frequency over Fiber (RFoF) 546 signal and transmission using a fiber-optic connection. In an alternative embodiment, signal 310B can be received by an off-air repeater, e.g., received by an antenna receiver communicatively coupled to cell site 320. Further, the off-air repeater can also be a component of tower components 375, with signal 310B being received by tower components 375, and combined with signal 325A.

In alternative or additional embodiments, signal 310B can also be received via the IP 515 signal discussed above, e.g., delivered to integrated access device 520 using packets 516. Integrated access device 520 can also allocate signal 310B via IP 522 to repeater 530, where the SDARS signal can be amplified by MHU 560, converted to an optical signal (e.g., RFoF 546 or CPRI 547B) and communicated to tower components 375 for combination with signal 325B and transmission. In an example implementation, amplifier 460 can be a part of a Distributed Antenna System (DAS).

In alternative or additional embodiments, signal 310B can be received by integrated access device 520 and communicated directly via IP 522 to a combined repeater 530 and MHU 560 component (not shown) for conversion into CPRI 547B signal for communication to tower components 375. In one or more embodiments, the one or more of the functions performed by functions performed by MHU 560 and repeater 530 can also be performed outside of cell site 320, e.g., as a part of a centralized radio access network (C-RAN) architecture. Benefits of this approach can include a reduction in floor space used by components at cell site 320, use of a one to many approach (e.g., one signal 325B can be generated in CPRI 547B form and relayed to multiple cell sites 320 and towers 370), reduction in circuit costs, and a potential to be used by other entities, including satellite radio providers.

Figure 6:
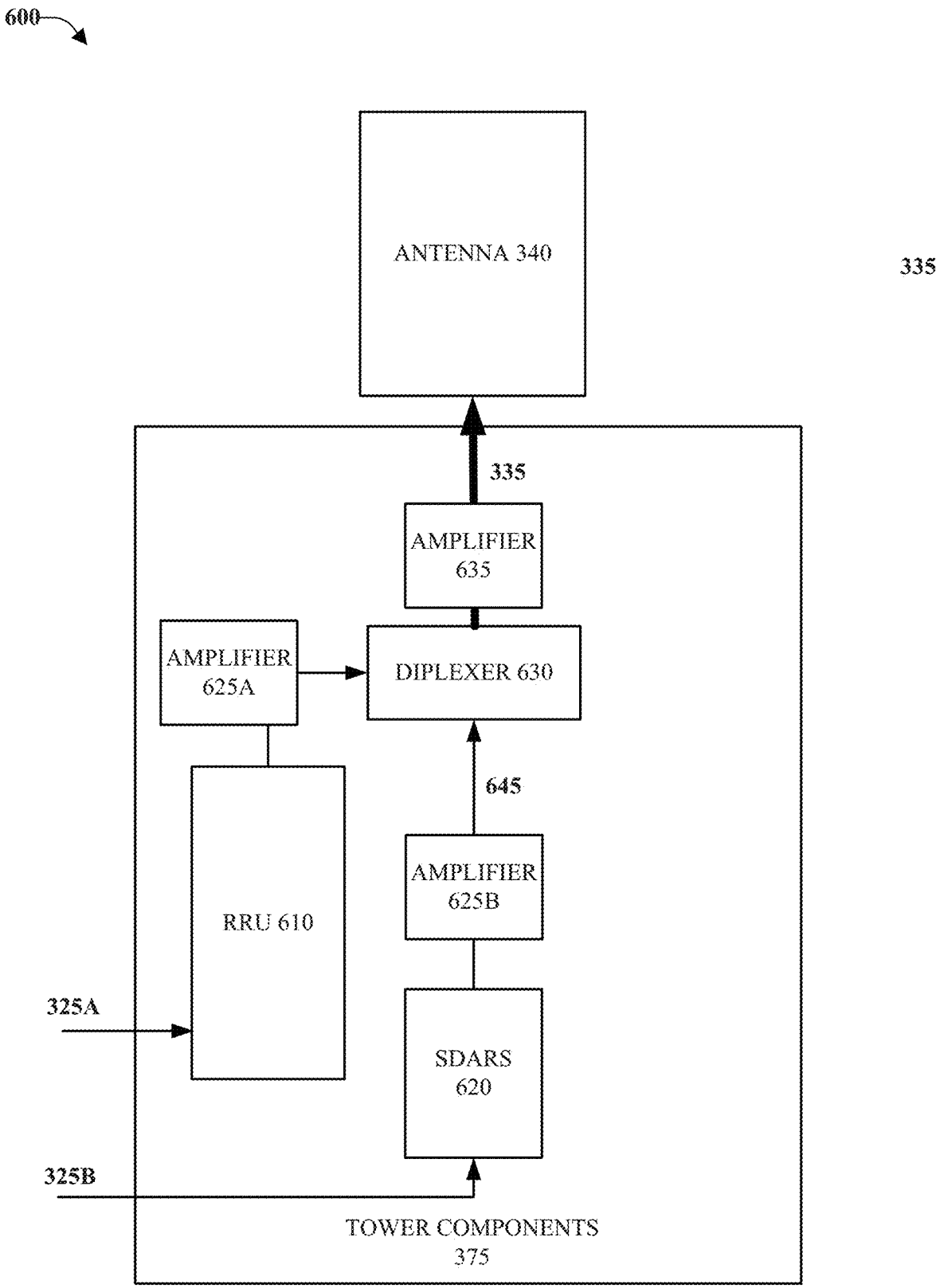
FIG. 6 depicts a more detailed view of tower components of the tower of FIG. 3 in accordance with one or more embodiments.

FIG. 6 depicts a more detailed view 600 of tower components 375 of tower 370 in accordance with one or more embodiments. Repetitive description of like elements employed in other embodiments described herein is omitted for sake of brevity. It should be noted that embodiments discussed with the description of FIG. 6 below, do not have to contain all of the elements depicted in FIG. 6.

In one or more embodiments, signal 325A (e.g., received by fiber-optic connection in CPRI 547A format) can be received by Remote Radio Unit (RRU) 610 from BBU 540, and signal 325B can be received (e.g., received by fiber-optic connection in RFoF 546 or CPRI 547B format) by SDARS component 620. In one or more embodiments, after RRU 610 and SDARS 620, signals 325A-B respectively can be amplified by amplifiers 625A-B. In one or more embodiments, the amplification of one or more of signals 325A-B can perform some of the functions described above as performed by strength adjuster 410, e.g., boosting one signal or another to establish a desired ratio between the signals.

It is important to note that signal 325B, at the point of diplexing by diplexer 630 (e.g., similar to combiner 330 described above) can be either an analog signal (e.g., RFoF 546) or a digital signal (e.g., CPRI 547B), and whichever of the two formats are used, can be combined with signal 325A, resulting in combined signal 335. Example ratios are discussed above with FIG. 2, and additionally, a ratio where signal 325B is 17-18 dB below signal 325A can also be used, e.g., when an off-air repeater is used to generate signal 325B.

As depicted, after generation, signal 335 can be amplified by amplifier 635 before communication to antenna 340. In an example embodiment, signal 325A can be WCS frequency signals, and antenna 340 and transmission equipment (not shown) can be enabled to transmit and receive WCS communications.

Figure 7:
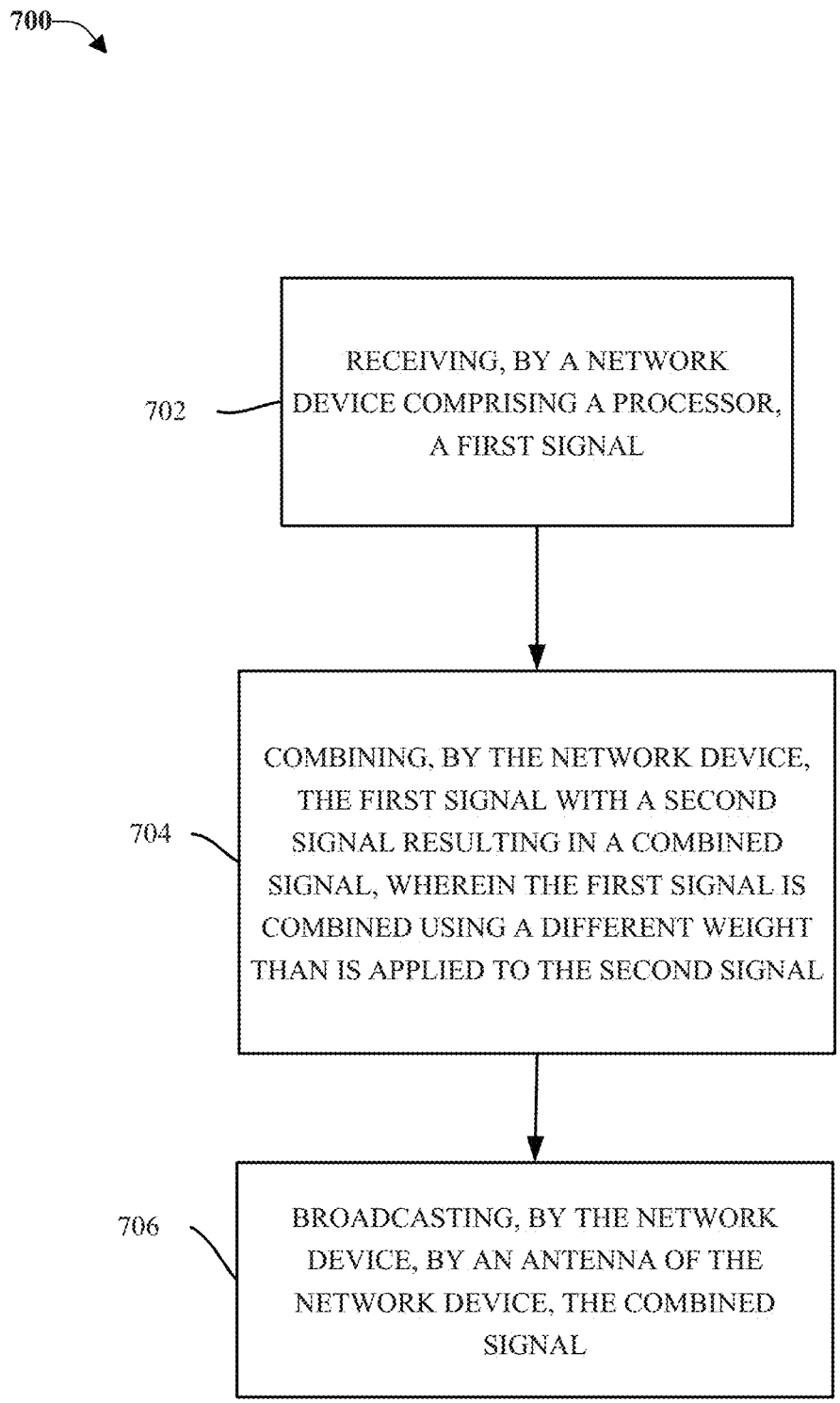
FIG. 7 illustrates a flow diagram of an example method, in accordance with one or more embodiments.

FIG. 7 illustrates a flow diagram of an example method 700, in accordance with one or more embodiments. For purposes of brevity, description of like elements and/or processes employed in other embodiments is omitted.

At 702, method 700 can receive, by a network device comprising a processor, a first signal. For example, method 700 can receive, by a network device (e.g., tower components 375) comprising a processor (e.g., processing unit 914), a first signal (e.g., signal 325A from cell site 320). At 704, method 700 can combine, by the network device, the first signal with a second signal resulting in a combined signal, and the first signal can be combined using a different weight than is applied to the second signal. For example, method 700 can combine (e.g., by diplexer 630), by the network device (e.g., by tower components 375), the first signal (e.g., signal 325A) with a second signal (e.g., signal 325B) resulting in a combined signal, and the first signal can be combined using a different weight (e.g., by strength adjuster 410) than is applied to the second signal (e.g., in combined signal 335, signal 325B has 6 dB less power than signal 325A).

At 706, method 700 can broadcast, by the network device, by an antenna of the network device, the combined signal. For example, method 700 can broadcast, by the network device (e.g., tower components 375), by an antenna (e.g., by employing antenna 540) of the network device (e.g., cell site 320 and tower 370), the combined signal (e.g., signal 335).

Figure 8:
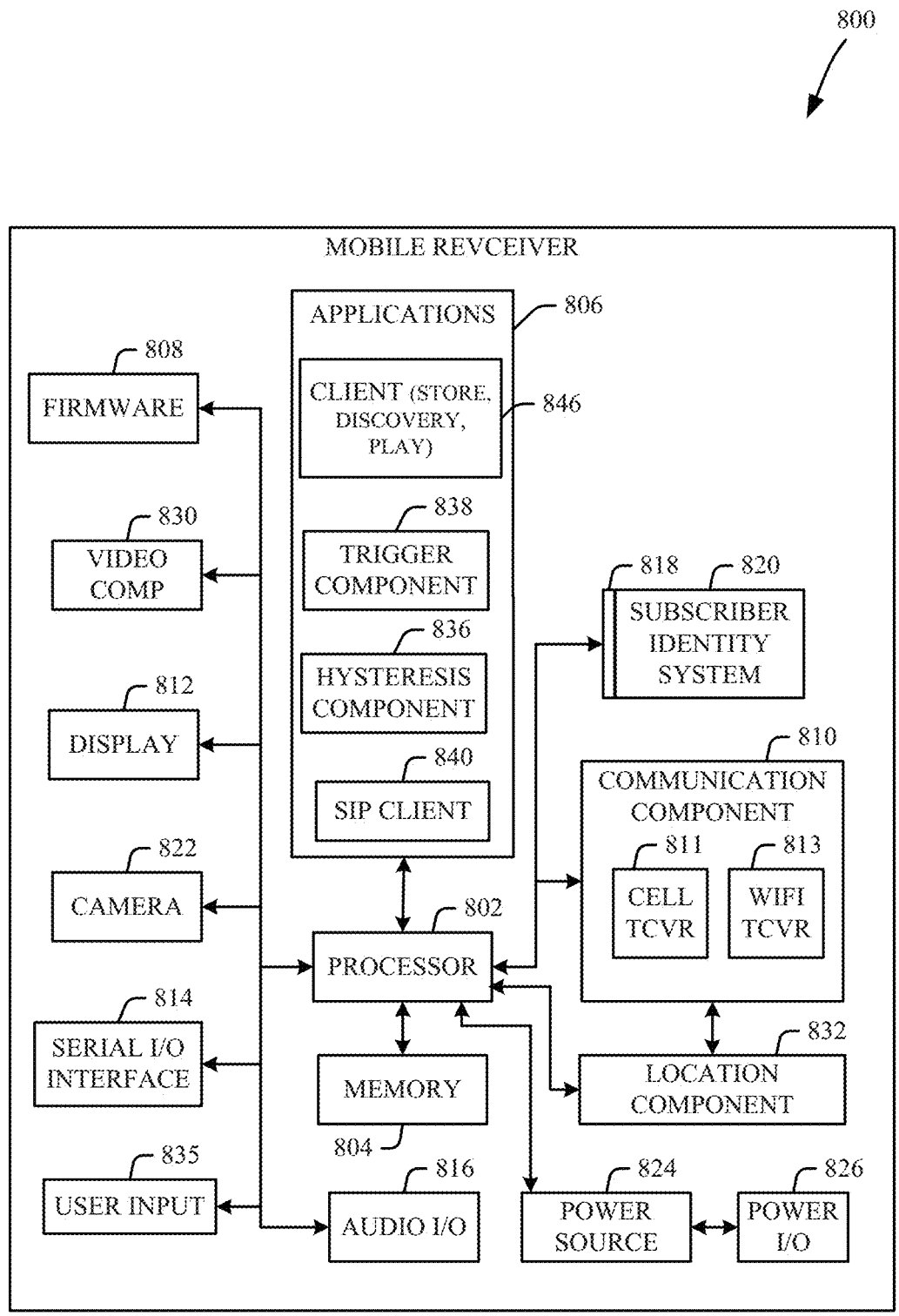
FIG. 8 illustrates is an example block diagram of an example mobile handset operable to engage in a system architecture can facilitate wireless communications according to one or more embodiments described herein.

FIG. 8 illustrates is an example block diagram of an example mobile handset 800 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the handset 800. A communications component 810 interfaces to the processor 802 to facilitate wired/wireless communication with external systems, e.g., cellular networks, VoIP networks, and so on. Here, the communications component 810 can also include a suitable cellular transceiver 811 (e.g., a GSM transceiver) and/or an unlicensed transceiver 813 (e.g., Wi-Fi, WiMax) for corresponding signal communications. The handset 800 can be a device such as a cellular telephone, a PDA with mobile communications capabilities, and messaging-centric devices. The communications component 810 also facilitates communications reception from terrestrial radio networks (e.g., broadcast), digital satellite radio networks, and Internet-based radio services networks The handset 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1294) through a hardwire connection, and other serial input devices (e.g., a keyboard, keypad, and mouse). This supports updating and troubleshooting the handset 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The handset 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the handset 800, and updated by downloading data and software.

The handset 800 can process IP data traffic through the communications component 810 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The handset 800 also includes a power source 824 in the form of batteries and/or an AC power subsystem, which power source 824 can interface to an external power system or charging equipment (not shown) by a power I/O component 826.

The handset 800 can also include a video component 830 for processing video content received and, for recording and transmitting video content. For example, the video component 830 can facilitate the generation, editing and sharing of video quotes. A location tracking component 832 facilitates geographically locating the handset 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the handset 800 to support SIP protocols and register the subscriber with the SIP registrar server. The applications 806 can also include a client 842 that provides at least the capability of discovery, play and store of multimedia content, for example, music.

The handset 800, as indicated above related to the communications component 810, includes an indoor network radio transceiver 813 (e.g., Wi-Fi transceiver). This function supports the indoor radio link, such as IEEE 802.11, for the dual-mode GSM handset 800. The handset 800 can accommodate at least satellite radio services through a handset that can combine wireless voice and digital radio chipsets into a single handheld device.

As can be seen, the technology described herein can provide increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology can facilitate reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

In example implementations, user equipments are able to send and/or receive communication data via a wireless link to the network device. Wireless communication system 200 can thus include one or more communication service provider networks that facilitate providing wireless communication services to various user equipments via the network device and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large-scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of systems described herein are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment.

The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general-purpose computing mechanism described below with reference to FIG. 9 is but one example of a computing device.

Figure 9:
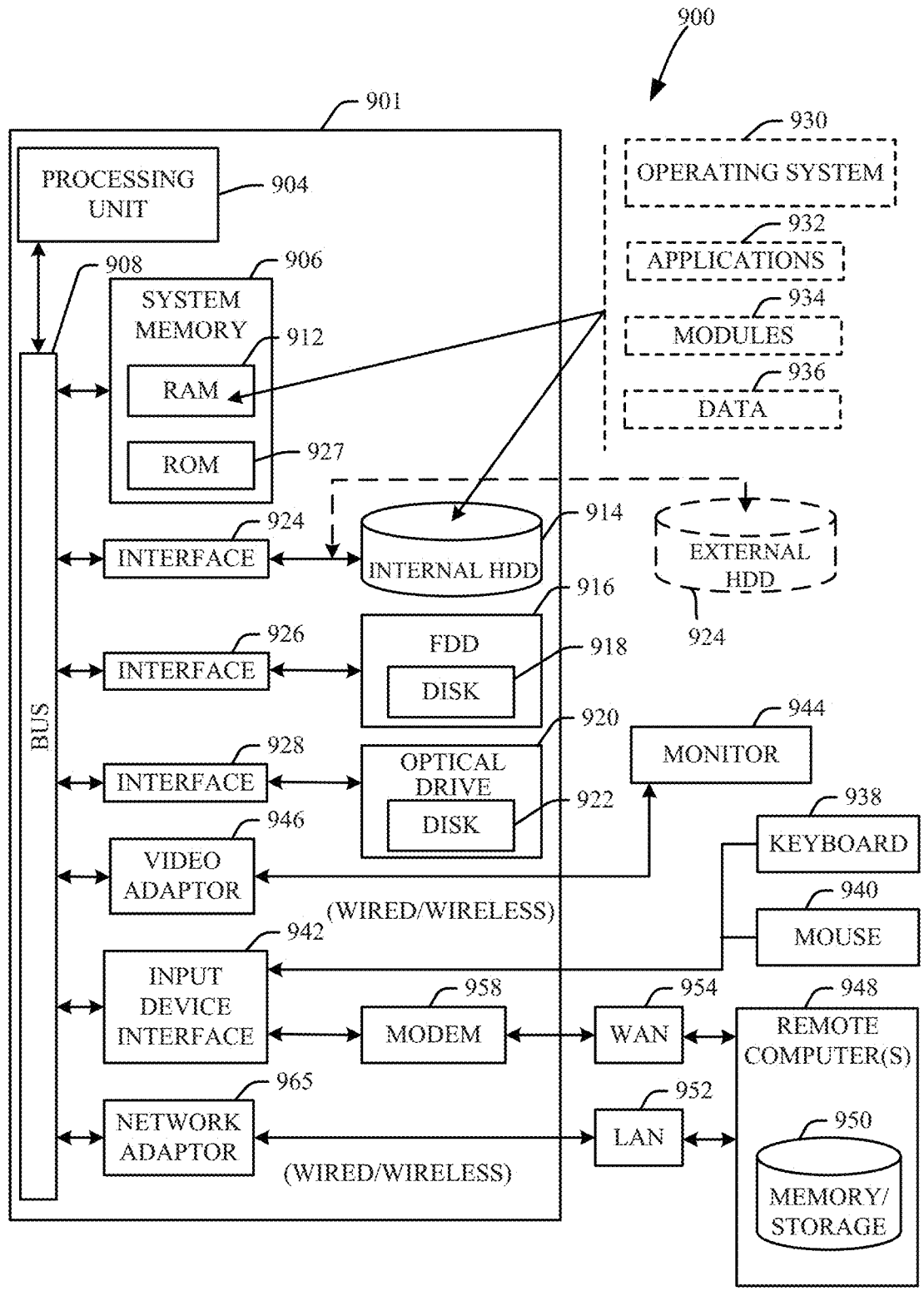
FIG. 9 illustrates a block diagram of an operating environment operable to execute the disclosed systems and methods in accordance with an embodiment.

In order to provide a context for the various aspects of the disclosed subject matter, FIG. 9 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 920 (see below), non-volatile memory 922 (see below), disk storage 924 (see below), and memory storage 946 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 9 illustrates a block diagram of an operating environment 900 operable to execute the disclosed systems and methods in accordance with an embodiment. Computer 912, which can be, for example, part of the hardware of system 920, includes a processing unit 914, a system memory 916, and a system bus 918. System bus 918 couples system components including, but not limited to, system memory 916 to processing unit 914. Processing unit 914 can be any of various available processors. Dual microprocessors and other multiprocessor architectures also can be employed as processing unit 914.

System bus 918 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 894), and Small Computer Systems Interface (SCSI).

System memory 916 can include volatile memory 920 and nonvolatile memory 922. A basic input/output system (BIOS), containing routines to transfer information between elements within computer 912, such as during start-up, can be stored in nonvolatile memory 922. By way of illustration, and not limitation, nonvolatile memory 922 can include ROM, PROM, EPROM, EEPROM, or flash memory. Volatile memory 920 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 can also include removable/non-removable, volatile/non-volatile computer storage media. FIG. 9 illustrates, for example, disk storage 924. Disk storage 924 includes, but is not limited to, devices like a magnetic disk drive, floppy disk drive, tape drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to system bus 918, a removable or non-removable interface is typically used, such as interface 926.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 9 describes software that acts as an intermediary between users and computer resources described in suitable operating environment 900. Such software includes an operating system 928. Operating system 928, which can be stored on disk storage 924, acts to control and allocate resources of computer 912. System applications 930 take advantage of the management of resources by operating system 928 through program modules 932 and program data 934 stored either in system memory 916 or on disk storage 924. It is to be noted that the disclosed subject matter can be implemented with various operating systems or combinations of operating systems.

A user can enter commands or information into computer 912 through input device(s) 936. As an example, a mobile device and/or portable device can include a user interface embodied in a touch sensitive display panel allowing a user to interact with computer 912. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 914 through system bus 918 by way of interface port(s) 938. Interface port(s) 938 include, for example, a serial port, a parallel port, a game port, a universal serial bus (USB), an infrared port, a Bluetooth port, an IP port, or a logical port associated with a wireless service, etc. Output device(s) 940 and a move use some of the same type of ports as input device(s) 936.

Thus, for example, a USB port can be used to provide input to computer 912 and to output information from computer 912 to an output device 940. Output adapter 942 is provided to illustrate that there are some output devices 940 like monitors, speakers, and printers, among other output devices 940, which use special adapters. Output adapters 942 include, by way of illustration and not limitation, video and sound cards that provide means of connection between output device 940 and system bus 918. It should be noted that other devices and/or systems of devices provide both input and output capabilities such as remote computer(s) 944.

Computer 912 can operate in a networked environment using logical connections to one or more remote computers, such as remote computer(s) 944. Remote computer(s) 944 can be a personal computer, a server, a router, a network PC, cloud storage, cloud service, a workstation, a microprocessor-based appliance, a peer device, or other common network node and the like, and typically includes many or all of the elements described relative to computer 912.

For purposes of brevity, only a memory storage device 946 is illustrated with remote computer(s) 944. Remote computer(s) 944 is logically connected to computer 912 through a network interface 948 and then physically connected by way of communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 950 refer(s) to hardware/software employed to connect network interface 948 to bus 918. While communication connection 950 is shown for illustrative clarity inside computer 912, it can also be external to computer 912. The hardware/software for connection to network interface 948 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, one or more embodiments is not to be limited to any single implementation, but rather is to be construed in breadth, spirit and scope in accordance with the appended claims.

What is claimed is:

1. Base station equipment, comprising:
a processor;
base station transceiver equipment; and
a memory that stores executable instructions that, when executed by the processor, facilitate performance of operations, comprising:
receiving a first signal from a source of satellite radio signals, wherein the first signal comprises a satellite radio signal;
receiving a second signal from network core equipment, wherein the second signal comprises a bidirectional cellular network data signal of a cellular data network;
based on an amount of interference reduction to be achieved between the first signal and the second signal at a time when the first signal and the second signal are broadcast, selecting a second signal strength to apply to the second signal that is different than a first signal strength to apply to the first signal, wherein selecting the second signal strength is further based on an interference to be mitigated as a result of a received part of the bidirectional cellular network data signal;

combining the first signal with the second signal resulting in a combined signal, wherein the first signal is combined using the first signal strength and the second signal is combined using the second signal strength; and broadcasting, by an antenna of the base station transceiver equipment, to a satellite radio receiver and a user equipment of the cellular data network, the combined signal, wherein the combined signal is for reception by the satellite radio receiver in a first geographic location and the user equipment in a second geographic location, wherein the first geographic location and second geographic location are different geographic locations.

2. The base station equipment of claim 1, wherein combining the first signal with the second signal comprises combining according to an analog combination that combines a first analog signal and a second analog signal.

3. The base station equipment of claim 1, wherein combining the first signal with the second signal comprises combining according to a digital combination that combines a first digital signal and a second digital signal.

4. The base station equipment of claim 1, wherein the satellite radio signal is received via a radio frequency over fiber protocol.

5. The base station equipment of claim 1, wherein the combining comprises diplexing the first signal and the second signal, resulting in the combined signal being a frequency-domain multiplexed signal.

6. The base station equipment of claim 1, wherein the base station equipment further comprises off-air repeater equipment, and wherein receiving the first signal comprises receiving the first signal by the off-air repeater equipment.

7. The base station equipment of claim 1, wherein the first signal comprises an internet protocol signal.

8. The base station equipment of claim 1, wherein the second signal is communicated via an ethernet to cell site protocol.

9. The base station equipment of claim 1, wherein the operations further comprise converting the first signal from a radio frequency signal to an optical signal.

10. A method, comprising:
receiving, by network equipment comprising a processor, a first signal from a source of satellite radio signals;
receiving a second signal from network core equipment of a cellular data network;
selecting a first signal strength based on an amount of interference reduction to be achieved between the first signal and the second signal at a time when the first signal and the second signal are broadcast, wherein the first signal comprises a satellite radio signal, wherein the second signal comprises a bidirectional cellular network data signal of the cellular data network, and wherein selecting the first signal strength is further based on mitigating at least a part of interference for a received part of the bidirectional cellular network data signal;
combining, by the network equipment, the first signal with the second signal resulting in a combined signal, wherein the first signal is combined using the first signal strength and the second signal is combined using a second signal strength different from the first signal strength; and
broadcasting, by an antenna of the network equipment, to a satellite radio receiver in a first geographic location and a user equipment of the cellular data network in a second geographic location, the combined signal, wherein the first geographic location and second geographic location are different geographic locations.

11. The method of claim 10, wherein the satellite radio signal is received via a radio frequency over fiber protocol.

12. The method of claim 10, wherein the combining comprises diplexing the first signal and the second signal, resulting in the combined signal being a frequency-domain multiplexed signal.

13. The method of claim 10, wherein receiving the first signal comprises receiving the first signal by off-air repeater equipment of the network equipment.

14. The method of claim 10, wherein the first signal comprises an internet protocol signal.

15. The method of claim 10, wherein the second signal comprises a wireless communication network signal.

16. The method of claim 10, further comprising, converting, by the network equipment, the first signal from a radio frequency signal to an optical signal.

17. A non-transitory machine-readable medium, comprising executable instructions that, when executed by a processor of network equipment, facilitate performance of operations, comprising:
receiving a first signal from a source of satellite radio signals;
receiving a second signal from network core equipment of a cellular data network;
based on a specified amount of interference reduction to be achieved between the first signal and the second signal, selecting a different signal strength to apply to the first signal than a signal strength to apply the second signal, wherein the first signal comprises a satellite radio signal, wherein the second signal comprises a bidirectional cellular network data signal of the cellular data network, and wherein selecting the different signal strength to apply to the first signal is further based on mitigating at least part of interference associated with a received part of the bidirectional cellular network data signal at a time when the first signal and the second signal are broadcast;
combining the first signal with the second signal resulting in a combined signal, wherein the first signal is combined using the different signal strength than the signal strength applied to the second signal; and
broadcasting by antenna equipment of the network equipment, to a satellite radio receiver in a first geographic location and a user equipment of the cellular data network in a second geographic location, the combined signal, wherein the first geographic location and second geographic location are different geographic locations.

18. The non-transitory machine-readable medium of claim 17, wherein the combining comprises diplexing the first signal and the second signal, resulting in the combined signal being a frequency-domain multiplexed signal.

19. The non-transitory machine-readable medium of claim 17, wherein receiving the first signal comprises receiving the first signal by off-air repeater equipment.

20. The non-transitory machine-readable medium of claim 17, wherein the combining comprises diplexing the first signal and the second signal, resulting in the combined signal being a frequency-domain multiplexed signal.

* * * * *